April 6, 1965   P. A. BEZZERIDES   3,176,782
PLANT CHOPPER
Filed April 8, 1963   2 Sheets-Sheet 1

PAUL A. BEZZERIDES
INVENTOR

Huebner & Worrel
ATTORNEYS

April 6, 1965   P. A. BEZZERIDES   3,176,782
PLANT CHOPPER

Filed April 8, 1963   2 Sheets-Sheet 2

PAUL A. BEZZERIDES
INVENTOR

Huebner & Worrel
ATTORNEYS

United States Patent Office 3,176,782
Patented Apr. 6, 1965

3,176,782
PLANT CHOPPER
Paul A. Bezzerides, Orosi, Calif., assignor of one-half to
Arthur A. Bezzerides, Orosi, Calif.
Filed Apr. 8, 1963, Ser. No. 271,378
9 Claims. (Cl. 172—534)

The present invention relates to a plant chopper for chopping out or thinning plants in rows and more particularly to such a plant chopper providing an earth engaging rotatable blade which forms regularly spaced swaths substantially transversely through the rows and leaves spaced plant areas between the swaths with a minimum of damage to the remaining plants.

It has long been the practice in commercial agriculture devoted to the production of row crops, such as cotton, sugar beets, lettuce and the like to plant the seeds of such crops continuously along a predetermined row. The excess seedlings are subsequently removed from the rows at regularly spaced intervals. This is desirable in that only a limited number of mature plants can be supported in the row with such thinning operation permitting the remaining plants to grow to full productive maturity.

In the past, such thinning or chopping operation has been accomplished by manual hoeing, or by mechanical implements provided for the purpose. Such implements are provided with chopping blades mounted for oscillation or rotation in a plane transverse to their direction of movement longitudinally of the row of plants. With such compound movement of the blades, it is difficult to accurately control the swath removed from the row. These implements require drive gearing or control linkages to synchronize the transverse oscillation of the blade with the longitudinal movement of the vehicle supporting the blade. Such linkages are subject to fluctuating lateral thrust tending to cause misalignment with selected rows of plants and require frequent adjustment. Consequently, the precise thinning of the plants is difficult to attain.

Therefore, it is an object of the present invention to provide an improved plant chopper for thinning plants in rows.

Another object is to provide an improved plant chopper which effectively and accurately thins plants in rows with a minimum of damage to surviving plants selected to grow to maturity.

Another object is to provide such an improved plant chopper which utilizes a substantially circular rotary chopping blade.

Another object is to provide a plant chopper having such a chopping blade mounted for movement longitudinally along the rows of plants in a plane obliquely related to the rows for rotation incident to ground engagement during such movement.

Another object is to provide a plant chopper having a circular chopping blade which has a plurality of cutting edges movable substantially transversely of the rows in regularly spaced intervals during rotation of the blade.

Another object is to provide such a plant chopper having a mounting frame adapted to permit limited floating movement of the blade so as to conform to elevations and depressions in the earth traversed.

Other objects and advantages of the present invention will subsequently become more fully apparent in the following description in the specification.

Figure 1:
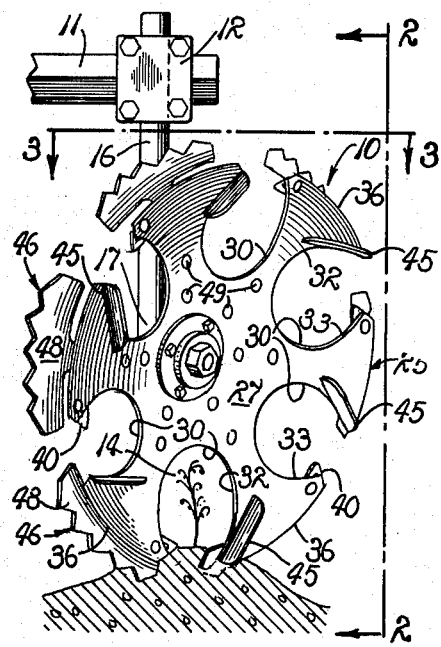
FIG. 1 is a front elevation of the chopping blade of the present invention shown in an operating position aligned with a row of plants.

Referring more particularly to the drawings, the plant chopper 10 of the present invention is adapted to be adjustably mounted on an elongated tool bar 11 by a bracket 12. The tool bar 11 is adapted to be carried for earth traversing movement along a row of plants 14 on a vehicle such as a tractor or the like, not shown. A substantially vertically disposed tool post 16 is held by the bracket 12 against the tool bar in depending relation therefrom. The tool post has an angularly downwardly extended lower end 17 having an included angle of approximately 115°. A hub 18 having an enlarge annular radially extended flange 19 is mounted on the lower end 17 of the tool post in freely rotating relation therewith about the axis of the lower end 17. When the tool post is clamped in an operating position on the tool bar, the axis of the lower end 17 of the tool post is disposed in an upright plane angled approximately 45° in relation to the row of plants.

The chopper 10 provides a substantially circular earth engaging chopping blade 25 which is mounted in concentric relation about the lower end 17 of the tool post for rotation with the hub 18. A plurality of bolts 26 are extended through the flange 19 and the blade dependably to hold the blade in such position. The blade has a forwardly disposed concave side 27 an an opposite rearwardly disposed convex side 28. A plurality of substantially horse-shoe shaped openings 30 are extended axially through the blade in circumferentially spaced peripherally interrupting relation. The openings are defined by continuous leading and trailing edges 32 and 33 which correspond to the direction of rotation of the blade about the axis of the lower end 17 of the tool post. Said edges provide a rounded surface so as not to injure plants passing through the openings 30. The leading and trailing edges preferably terminate at the periphery of the blade 25 in opposite angularly outwardly diverging edges 34 and 35 so as to leave a frusto-pyramidal shaped plant portion in the row.

The blade 25 also includes a plurality of peripherally extended cutting edges 36 disposed in equally circumferentially spaced relation between the openings 30. A plurality of elongated strap-like auxiliary chopping blades or cutting edge extension members 40, each having an elongated slot 41 therein are individually mounted on the blade 25 by bolt and nut members 42 extended through the slots at positions adjacent to the trailing edges 33 of the openings 30 and slightly radially inwardly spaced from the cutting edges 36. The cutting edge extension members have leading edges 43 correspondingly angled in conforming relation to the angular portion 35 of the trailing edges 33 of their respective openings 30 so as to maintain the frusto-pyramidal shape of the remaining plant areas through the full range of cutting edge adjustment.

A plurality of earth turning fins 45 are rigidly mounted on the blades along the leading edges 32 of the openings in outwardly extended right angular relation to the concave side 27 of the blade. A plurality of blade drive members 46 each having a somewhat flexible shank portion 47 and a substantially right angularly related earth engaging toothed shoe portion 48 are mounted on the rearward convex side 28 of the blade 25 by bolts 49. The shank portions 47 are mounted in radially extended circumferentially spaced relation on the blade with the toothed shoe portion 48 extended radially outwardly of the cutting edges 36 and in axially spaced relation thereto.

Figure 7:
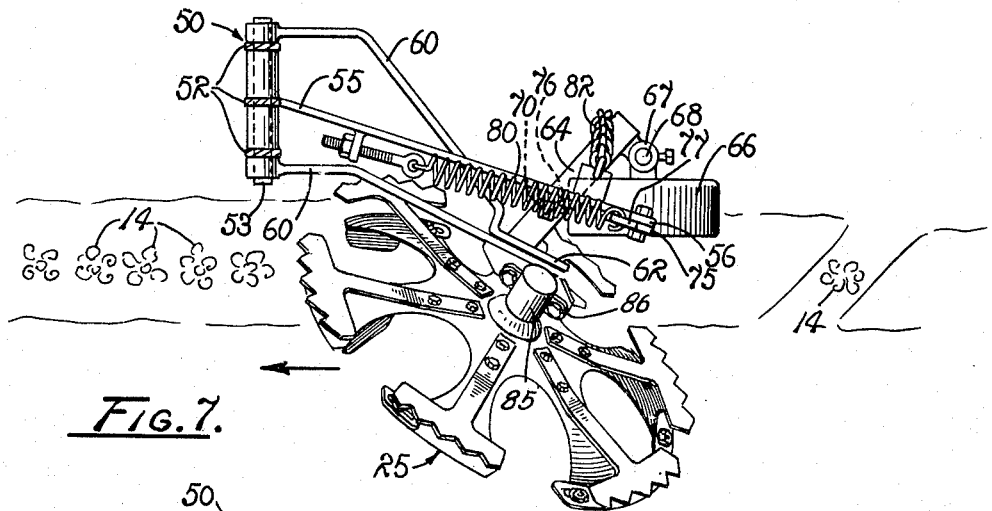
FIG. 7 is a top plan view similar to FIG. 3 but showing a modified form of the mounting frame for the chopping blade.
Figure 8:
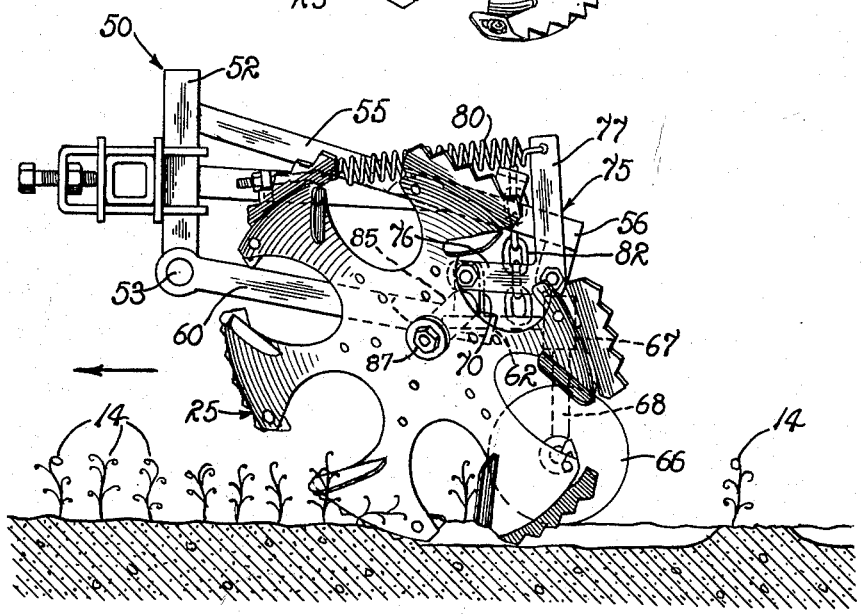
FIG. 8 is a side elevation of the chopping blade and mounting frame of FIG. 7.

A second form of the mounting portion of the chopping blade is shown in FIGS. 7 and 8. Such mounting provides a frame generally indicated by the reference numeral 50 having a plurality of upright bars 52 interconnected by a lower pivot shaft 53. The end bars 52 are rigidly secured to the tool bar 11 by a pair of the brackets 12, as in the first form of the blade mounting. An elongated rigid support arm 55 is rigidly mounted on the intermediate bar 52 in rearwardly downwardly inclined relation therefrom and terminates in a right angularly downwardly extended end 56. A pair of pivot arms 60 are journaled on the pivot shaft 53 of the frame and are rearwardly extended therefrom a predetermined distance in spaced substantially parallel relation to each other and thence are angularly transversely bent in rearwardly converging relation and interconnected in overlying superimposed relation to form an outer mounting end 62. A substantially horizontal bracket 64 is mounted on the outer ends 62 of the pivot arms to provide an upright mounting for a gauge wheel 66. The bracket includes a pair of spaced aligned bearing members 67 having lock screws screwthreadably received therein to hold a mounting rod 68 of the gauge wheel.

A tab 70 is mounted on the bracket 64 in upwardly extended relation therefrom in a plane substantially aligned with the rigid support arm 55. A substantially L-shaped lever arm 75 has a lower end 76 pivotally mounted on the tab 70 and an opposite upper end 77. The lever 75 is pivotally mounted intermediate its ends on the downwardly extended outer end 56 of the support arm 55. An adjustable tension spring 80 is connected at one end to the upper end of the lever 75 and at its opposite end is provided a screw-threadable connection with the support arm 55 at a point closely adjacent to the upright bars 52 of the frame. An elongated chain 82 is connected between the support arm 55 and the gauge wheel bracket 64 to limit downward travel of the pivot arms 60. An elongated axle shaft 85 is rigidly secured to the outer end 62 of the pivot arms in transversely outwardly extended relation therefrom opposite to the bracket 64 by cap screws 86. The axle shaft 85 is internally screw-threaded to receive a blade mounting bolt 87 which is extended through the chopping blade 25 for mounting the same thereon in a plane obliquely related to the direction of movement of the frame and to the row of plants.

*Operation*

Figure 2:
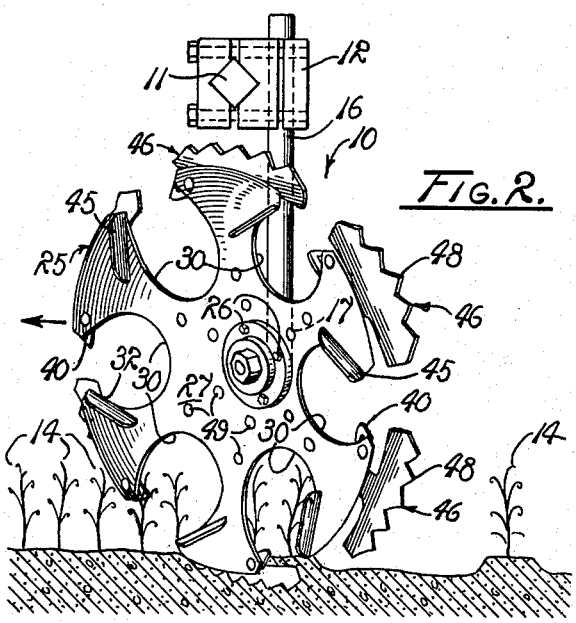
FIG. 2 is a side elevation of the chopping blade viewed in a direction indicated by the line 2—2 of FIG. 1.
Figure 3:
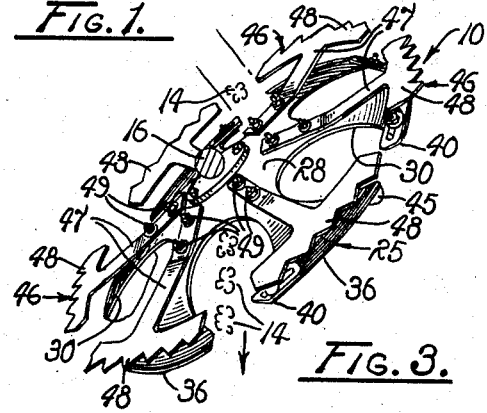
FIG. 3 is a top plan view of the chopping blade as viewed from line 3—3 of FIG. 1.
Figure 4:
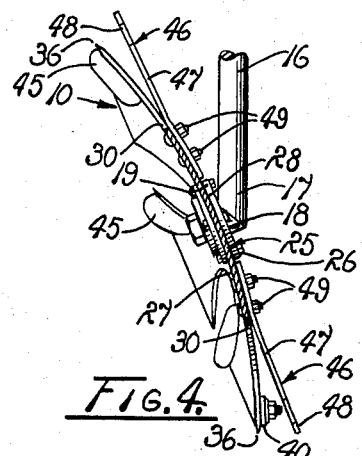
FIG. 4 is a side elevation of the chopping blade with portions broken away for illustrative convenience.
Figure 5:
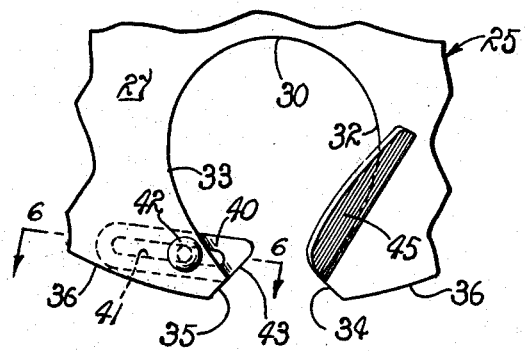
FIG. 5 is a somewhat enlarged fragmentary front elevation of the chopping blade showing a plant receiving opening therethrough and having an adjustable cutting edge extension member disposed adjacent to the opening.
Figure 6:
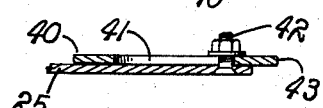
FIG. 6 is a somewhat enlarged fragmentary horizontal section taken on line 6—6 of FIG. 5.

The operation of the described embodiments of the subject invention is believed to be clearly apparent and is briefly summarized at this point. In the first form of the chopping blade mounting having the tool post 16, the blade is disposed in oblique angular relation to its direction of movement longitudinally along the rows. More specifically, the plane of the blade is disposed approximately at a 45° angle relative to the row of plants and is forwardly tipped so that during forward movement therealong the blade is rotated about the axis of the hub 18 in the direction of the arrows in FIGURES 2 and 3. With the drive members 46 and the cutting edges 36 of the blade in earth engagement, such forward movement and rotation of the blade causes the cutting edges to move substantially transversely through the rows to cut a swath in substantially aligned relation with the axis of the hub 18. The toothed shoe portion 48 of the drive members 46 provides positive blade rotation when working in loose soil or when disposed for shallow earth penetration. The teeth thereof permit the soil to exhaust therebetween to minimize the packing of soil between the shoe portions and the blade. In hard packed soil the flexible shank portions permit sufficient flexing so as to preclude sticking of the shoe portions in such soil. Also, the toothed shoe portions have a beneficial mulching effect on the soil engaged thereby.

Also during such forward movement and rotation of the blade the openings 30 are effective to permit the passage of selected plants 14 in a row while remaining rooted in regularly spaced, frusto-pyramidally shaped, hills along the row between the swaths formed by the cutting edges 36. The angled portions 34 and 35 of the leading and trailing edges 32 and 33 of the openings 30 provide such frusto-pyramidal hill shape so as to leave a maximum root system for the surviving plants in the spaced plant areas. During ground engagement of the cutting edges 36, the fins 45 along the leading edges 32 of the openings are effective to prevent earth being moved by the cutting edges from spilling rearwardly through the succeeding opening. Such fins insure that a clean swath is formed through the rows by the cutting edges with the earth being removed thereby transversely of the rows away from the spaced plant areas. The peripheral dimension of the openings 30 is readily adjusted by the extension members 40. Such adjustment is accomplished by loosening the bolts 42 and longitudinally sliding the extension members across the openings which is effective to lengthen its respective cutting edges 36 of the blade and correspondingly to decrease the peripheral dimension of the opening 30. The extension member is then locked in such adjusted position by tightening of the bolt 42. The angular leading edge 43 of the extension members while forming a shoulder along the plant areas maintains the frusto-pyramidal shape of such plant areas in the rows.

The chopping blade 25 may also be mounted on the floating frame 50 of FIGURES 7 and 8. The axle shaft 85 thereof is disposed in the same angular relationship with the direction of movement and the row of plants as the lower end 17 of the tool post 16 of the first form of rigid mounting. Consequently, the chopping blade is disposed in a plane obliquely related to its forward direction of movement and to the row of plants and is forwardly tipped so that during such movement the blade is rotated in the direction of the arrows of FIGURES 8 and 9. As in the first form, the cutting edges 36 of the blade move substantially transversely of the rows to cut a swath therethrough substantially aligned with the axis of the axle shaft 85. As best shown in FIG. 8, the depth of the swath is accurately controlled by the adjustable gauge wheel 66. During forward movement of the frame 50, the pivot arms 60 are permitted limited rotation about the pivot shaft 53 on the frame in order for the chopping blade 25 accurately to conform to elevations and depressions encountered in the earth traversed. Upon encountering an elevation in the earth, the blade 25 and the pivot arm 60 are permitted upward movement which action causes the lever 75 to be pivoted about the outer end 56 of the support arm 55. This causes the upper end 77 of the lever to move in a clockwise direction, as viewed in FIG. 8, to tension the spring 80. It is readily apparent that after the blade has passed such elevation, the tension on the spring 80 will return the pivot arm 60 and the blade downwardly to the desired depth relative to the gauge wheel 66. Also when depressions are encountered in the earth, such tension provided by the spring 80 on the lever 75 causes the chopping blade to be urged downwardly in conforming relation to such depression.

In view of the foregoing, it is believed apparent that the structure of the present invention provides an improved plant chopper for thinning plants in rows. Such improved chopper effectively and accurately thins such plants by removing regularly spaced swaths from the rows while leaving equally regularly spaced plant areas between the swaths with a minimum of damage to the surviving plants. The chopping blade 25 of the present invention is readily adapted to be rigidly mounted on an earth traversing vehicle or it may be mounted for floating movement so as to conform to elevations and depressions encountered in the earth traversed. While the described rigid and floating mountings characterize suitable means for effectively holding and positioning the chopping blade in the desired manner it is readily apparent that other means having a rotatable blade mounting can be employed. Also, the chopping blade 25 requires no complicated synchronizing mechanisms, is automatically rotated by forward movement of the support vehicle longitudinally along the rows of plants, and thereby is effective to form the same size swaths through the rows regardless of vehicle speed in a normal operating range. Furthermore, the length of the swath and the corresponding plant areas therebetween can be adjusted within predetermined limits to leave the optimum size plant areas which can be supported in the row to insure full maturity of the surviving plants.

Although the invention has been herein shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A chopper for thinning plants in rows, said chopper being adapted for earth traversing movement in a predetermined forward direction of travel longitudinally along such rows of plants, comprising a hub mounted for rotation about an axis disposed in oblique angular relation to said forward direction of travel; and a substantially circular concavo-convex earth engaging chopping blade mounted on the hub for rotation about said axis incident to said earth traversing movement of the chopper, said chopping blade having a plurality of horseshoe-shaped openings therethrough defined by continuous leading and trailing edges corresponding to the direction of rotation of the blade, a plurality of peripherally extended circumferentially spaced cutting edges individually disposed between pairs of adjacent openings so that during said rotation and forward movement of the blade said cutting edges move successively through the rows of crops in a direction aligned with the axis of the hub to form spaced swaths therethrough with said openings leaving spaced plant areas in the rows between the swaths; and a plurality of earth turning members individually mounted on the blade along said leading edges of the openings and extended axially outwardly of the blade in substantially right angular relation thereto to minimize tumbling of the earth encountered by the preceding cutting edge of the blade rearwardly past said leading edges of the openings.

2. The chopper of claim 1 wherein a plurality of elongated auxiliary cutting edge members are adjustably mounted on the chopping blade individually adjacent to the trailing edges of the openings and individually having a cutting edge substantially continuous with said cutting edges of the blade for varying the effective length of said cutting edges of the chopping blade and the peripheral length of the openings.

3. A chopper for thinning plants in rows comprising a frame adapted to be mounted for earth traversing movement in a predetermined forward direction of travel longitudinally along such rows of plants, said frame having an elongated rigid support arm, a pair of interconnected pivot arms journaled on the frame at a point spaced below said rigid support arm, and a substantially L-shaped link having opposite upper and lower ends with the lower end pivotally connected to said pivot arm, said link being pivotally connected intermediate its ends on said rigid support arm; a resilient tension member interconnecting said upper end of the link and the rigid support arm normally to urge said pivot arms downwardly from the rigid support arm; a gauge wheel elevationally adjustably mounted on said pivot arms in transversely outwardly trailing relation thereto; an axle mounted on said pivot arm and extended in a direction transversely outwardly therefrom in opposed relation to said gauge wheel and in oblique angular relation to said forward direction of travel; a substantially circular concavo-convex earth engaging chopping blade mounted on said axle for rotation incident to earth traversing movement of the frame whereby said resilient tension member is alternately tensioned and relaxed to permit limited floating movement of the blade on said pivot arm in conforming relation to elevations and depressions encountered in the earth traversed, said chopping blade having a plurality of peripheral openings therethrough, and a plurality of peripherally extended circumferentially spaced cutting edges individually disposed between pairs of adjacent openings so that during said rotation and said forward movement of the blade the cutting edges move successively through the rows in a direction aligned with said axis of the blade to form spaced swaths through the rows with said openings leaving spaced plant areas in the rows between the swaths.

4. A chopper for thinning plants in rows comprising a frame adapted to be mounted for earth traversing movement in a predetermined forward direction of travel longitudinally along such rows of plants, said frame having an elongated rigid support arm, a pair of interconnected pivot arms journaled on the frame at a point spaced below said rigid support arm, and a substantially L-shaped link having opposite upper and lower ends with the lower end pivotally connected to said pivot arms and said link being pivotally connected intermediate its ends on said rigid support arm; a resilient tension member interconnecting said upper end of the link and the rigid support arm normally to urge said pivot arms downwardly away from the rigid support arm; a gauge wheel elevationally adjustably mounted on said pivot arm in transversely outwardly trailing relation thereto; an axle mounted on said pivot arm and extended in a direction transversely outwardly therefrom in opposed relation to said gauge wheel and in oblique angular relation to said forward direction of travel; a substantially circular concavo-convex earth engaging chopping blade mounted on said axle for rotation incident to earth traversing movement of the frame whereby said resilient tension member is alternately tensioned and relaxed to permit limited floating movement of the blade on said pivot arm in conforming relation to elevations and depressions encountered in the earth traversed, said chopping blade having a plurality of horseshoe-shaped openings therethrough defined by continuous leading and trailing edges corresponding to the direction of rotation of the blade, a plurality of peripherally extended circumferentially spaced cutting edges individually disposed between pairs of adjacent openings so that during said rotation and forward movement of the blade said cutting edges move successively through the rows of crops in a direction aligned with the axis of the hub to form spaced swaths therethrough with said openings leaving spaced plant areas in the rows between the swaths; and a plurality of earth turning members individually mounted on the blade along said leading edges of the openings and extended axially outwardly of the blade in substantially right angular relation thereto to minimize tumbling of the earth encountered by the preceding cutting edge of the blade rearwardly past said leading edges of the openings.

5. The chopper of claim 4 wherein said leading and trailing edges of the openings provide inwardly diverging angular edge portions adjacent to said cutting edges of the blade so that said swaths formed through the rows by said cutting edges leave spaced substantially frusto-pyramidal plant areas in the rows between the swaths.

6. The chopper of claim 5 wherein a plurality of elongated auxiliary cutting edge members are adjustably mounted on the chopping blade individually adjacent to the trailing edges of said openings and having cutting edges substantially continuous with said cutting edges of the blade and providing leading cutting edge portions corresponding to the angularity of said angular edge portion of the trailing edges of the openings for varying the effective length of said cutting edges of the chopping blade and the peripheral length of the openings while maintaining said frusto-pyramidal shape of the plant areas between the swaths throughout the full range of said cutting edge adjustment.

7. The chopper of claim 6 wherein a plurality of blade drive members are rigidly mounted on the blade in radially extended relation individually beyond said cutting edges and in axially spaced relation thereto for earth engagement to provide a positive drive when the blade is positioned for shallow earth penetration.

8. The chopper of claim 7 wherein the blade drive members individually include an elongated resiliently flexible shank portion rigidly mounted in radially extending relation on the convex side of the blade and providing an integral toothed shoe portion radially outwardly extended beyond said cutting edges of the blade and in axially spaced relation thereto to drive the blade when the blade is disposed in shallow earth penetration and to mulch the remaining earth in the area engaged by the cutting edges.

9. A chopper for thinning plants in rows, said chopper being adapted for earth traversing movement in a predetermined forward direction of travel longitudinally along such rows of plants, comprising a hub mounted for rotation about an axis disposed in oblique angular relation to said forward direction of travel; a substantially circular earth engaging chopping blade mounted on the hub for rotation about said axis incident to said earth traversing movement of the chopper, said chopping blade having a plurality of openings therethrough defined by opposite edges and a plurality of peripherally extended circumferentially spaced cutting edges individually disposed between pairs of adjacent openings so that during said rotation and forward movement of the blade said cutting edges move successively through the rows of crops in a direction aligned with the axis of the hub to form spaced swaths therethrough with said openings leaving spaced plant areas in the rows between the swaths; and a plurality of earth turning members individually mounted on the blade along at least one of said edges of the openings and extended axially outwardly of the blade in substantially right angular relation thereto to minimize tumbling of earth encountered by the preceding cutting edge of the blade rearwardly past the opposite edge of the openings.

References Cited by the Examiner
UNITED STATES PATENTS

| 1,699,151 | 1/29 | Miller et al. | 172—540 |
| 2,505,560 | 4/50 | Mayberry et al. | 172—536 |
| 2,960,173 | 11/60 | Stone | 172—536 X |
| 3,040,818 | 6/62 | Mattson | 172—49 X |

FOREIGN PATENTS

| 788,250 | 12/57 | Great Britain. |
| 632,687 | 10/34 | Germany. |

T. GRAHAM CRAVER, *Primary Examiner.*